Oct. 18, 1949.     A. G. WAHL     2,485,247
COFFEE PERCOLATOR
Filed June 2, 1947
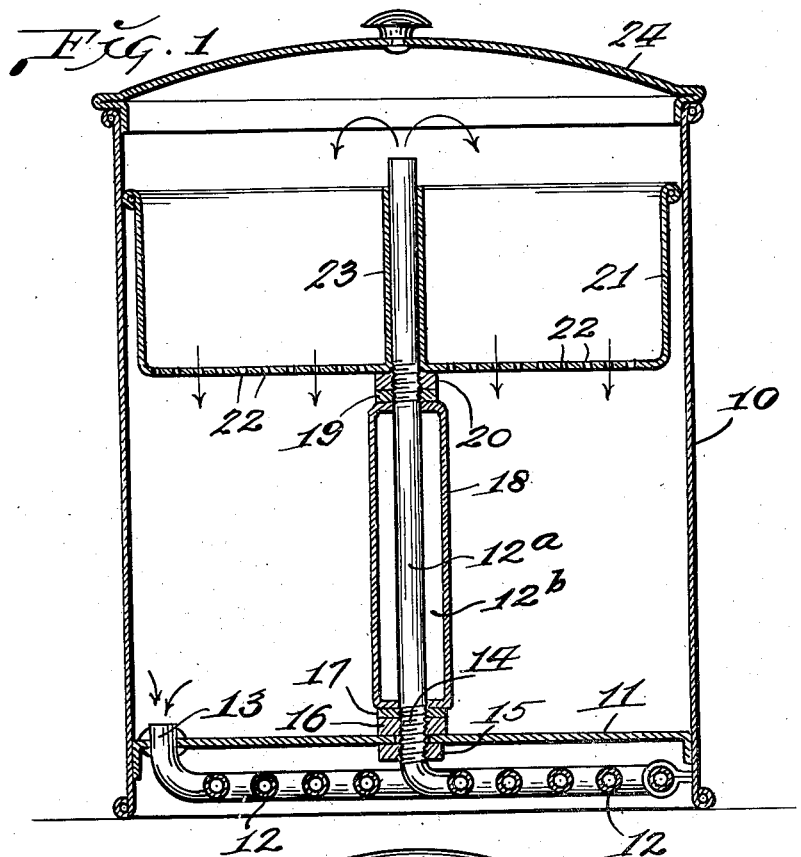
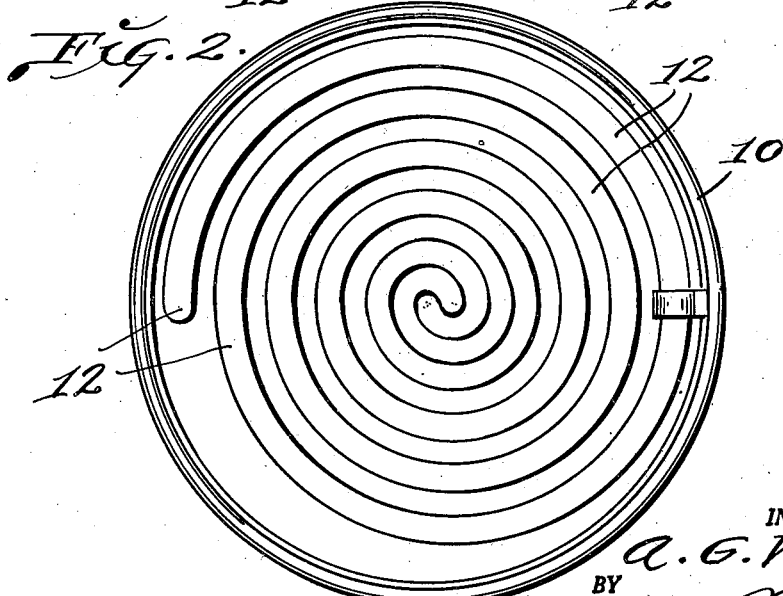
INVENTOR.
A. G. WAHL.
BY
Martin Smith
ATTY.

Patented Oct. 18, 1949

2,485,247

UNITED STATES PATENT OFFICE 2,485,247

COFFEE PERCOLATOR

Albert G. Wahl, Los Angeles, Calif.

Application June 2, 1947, Serial No. 751,930

1 Claim. (Cl. 103—231.5)

My invention relates to a coffee percolator and has for its principal objects, to generally improve upon and simplify the construction of the existing forms of similar utensils; to provide simple and efficient means for very rapidly establishing the percolation function after the utensil has been placed over an open flame or other source of heat, and further, to provide means for materially cutting down the escape of heat from the stream of liquid flowing from the heating coil to the bowl containing the ground or pulverized coffee, and which provision is effective in materially speeding up the production of potable coffee.

With the foregoing and other objects in view, my invention consists in certain novel features of construction and arrangement of parts which will be hereinafter more fully described and claimed and illustrated in the accompanying drawings, in which:

Fig. 1 is a vertical section taken through the center of a percolator constructed in accordance with my invention.

Fig. 2 is a view looking against the bottom of the percolator.

Referring by numerals to the accompanying drawing which illustrates a preferred embodiment of my invention, 10 designates the wall of a can-like container, 11 the bottom is slightly elevated with respect to the lower edge of said wall and 12, a coiled tube preferably of copper which is suitably secured in position beneath bottom 11.

The open outer end of coil 12 extends upwardly into the chamber in container above bottom 11 and extending vertically upward from the inner end of said coil, to a point near the top of the container is a tube 12a.

The lower portion of tube 12a is clamped to bottom 11 by nuts 15 and 16, screw seated on a threaded portion 14 of said tube and on top of the upper nut 16 is a packing disc.

Resting on packing ring 17 is the lower end of a cylindrical shell 18 larger in diameter than tube 12a, thus providing, around a substantial portion of the latter, a chamber 12b, from which the air is exhausted, thus providing insulation to minimize transference of heat from the liquid passing upward through tube 12a, to the liquid in the container surrounding the shell 18.

Mounted on the upper end of shell 18, is a packing ring 19 held in place by a nut 20, seated on a threaded portion of tube 12a. Those portions of tube 12a which are threaded are slightly enlarged as a result of internally applied pressure.

A shallow receptacle for the pulverized coffee, comprising a circular wall 21 and a bottom having small perforations 22, is provided with a centrally arranged tube 23, which receives the upper portion of tube 12a, and said receptacle rests on nut 20.

To use my improved percolator, water is placed in container 10, and pulverized coffee is placed in container 21 and when the utensil is positioned above the open flame of a gas burner or other source of heat, the water entering and passing through coil 12 will rapidly become heated and after flowing upwardly through tube 12 will discharge from the upper end thereof into container 21, and percolate through the body of pulverized coffee therein.

After passing through apertures 22 in the bottom of container 21, the liquid unites with the liquid in the lower portion of container 10, thus completing its cycle flow, and as the latter is repeated, the circulation of the liquid and percolating function becomes continuous, and thereby rapidly produces liquid coffee of the desired strength.

During flow of the highly heated liquid, from the inner end of coil 12, upwardly, the vacuum chamber between the lower portion of said tube and shell 18 counteracts transference of heat from the liquid flowing through the tube to the cooler liquid in container 10 surrounding said shell.

Thus my improved construction is particularly effective in materially decreasing the time ordinarily required for producing coffee by percolation methods.

Minor changes in the size, form and construction of the various parts of my improved coffee percolator may be made and substituted for those herein shown and described without departing from the spirit of the invention, the scope of which is set forth in the appended claim.

I claim as my invention:

In a coffee percolator, a container, a coiled tube disposed below and secured to the bottom of said container, the outer end of which tube communicates with the interior of said container, a tube extending upwardly into said container from the inner end of said coiled tube, heat insulating means comprising a shell surrounding and spaced apart from the lower portion of said upwardly extending tube, portions of the tube extending upwardly from the center of the coiled tube being threaded above and below said shell, a nut and packing ring on the threaded portion of said upwardly extending tube above said shell, a nut and packing ring on the threaded portion of said tube below said shell which last mentioned nut bears on top of the bottom of said container and a nut on the threaded portion of said tube below said shell and bearing on the under face of said container.

ALBERT G. WAHL.

REFERENCES CITED

The following references are of record in the file of this patent:

UNITED STATES PATENTS

| Number | Name | Date |
|---|---|---|
| 868,187 | Ives | Oct. 15, 1907 |
| 1,431,490 | Rowley | Oct. 10, 1922 |
| 1,452,256 | Rowley | Apr. 17, 1923 |
| 1,971,758 | Olds | Aug. 28, 1934 |